United States Patent [19]

Hirata

[11] Patent Number: 4,510,532

[45] Date of Patent: Apr. 9, 1985

[54] ROTARY RECORDING MEDIUM REPRODUCING APPARATUS

[75] Inventor: Atsumi Hirata, Fujisawa, Japan

[73] Assignee: Victor Company of Japan, Ltd., Japan

[21] Appl. No.: 482,064

[22] Filed: Apr. 5, 1983

[30] Foreign Application Priority Data

Apr. 6, 1982 [JP] Japan .................................. 57-56970

[51] Int. Cl.³ .............................................. G11B 3/30
[52] U.S. Cl. .................... 358/342; 369/126
[58] Field of Search ................ 358/342, 312; 369/126, 369/139, 219, 220

[56] References Cited

U.S. PATENT DOCUMENTS 4,102,536 7/1978 Clunis .................... 369/139
4,254,959 3/1981 Masterson .......................... 369/219
4,280,024 7/1981 Dholakia ............................ 369/126

Primary Examiner—Donald McElheny, Jr.
Attorney, Agent, or Firm—Andrus, Sceales, Starke & Sawall

[57] ABSTRACT

A rotary recording medium reproducing apparatus comprises a reproducing stylus for reproducing recorded signals from a rotary recording medium which is recorded with an information signal on a spiral track, by tracing over the spiral track on the rotary recording medium, a reproducing mode setting circuit for setting a reproducing mode of the reproducing apparatus to a special reproduction mode such as a quick-motion reproduction mode in which the reproducing stylus successively shifts to and traces over adjacent track turns of the spiral track and a still picture reproduction mode in which the reproducing stylus repeatedly traces over the same track turn of the spiral track, besides a normal reproduction mode in which the reproducing stylus successively and continuously traces over the spiral track, a stylus pressure control signal generating circuit for generating a stylus pressure control signal of a voltage having a magnitude in accordance with the set reproducing mode, according to the reproducing mode set by the reproducing mode setting circuit, and a stylus pressure applying circuit applied with the stylus pressure control signal generated by the stylus pressure control signal generating circuit, for applying a stylus pressure to the reproducing stylus.

6 Claims, 6 Drawing Figures

ROTARY RECORDING MEDIUM REPRODUCING APPARATUS

BACKGROUND OF THE INVENTION

The present invention generally relates to rotary recording medium reproducing apparatuses, and more particularly to a reproducing apparatus which reproduces signals recorded on a rotary recording medium by varying the stylus pressure of a reproducing stylus according to the reproducing mode.

A new information signal recording and/or reproducing system has been proposed in U.S. Pat. Nos. 4,315,283, 4,322,836, and 4,331,976 of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In this system, since no grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces over along the track in response to the reproduced reference signals.

By use of this previously proposed system, there is no possibility whatsoever of the reproducing or the disc being damaged since the recording track has no groove. The reproducing stylus can trace over the same portion of the track repeatedly many times, whereby a special reproduction such as still picture reproduction, slow-motion reproduction, and quick-motion reproduction becomes possible in a case where the recorded information signal is a video signal.

In order to carry out the above special reproduction, a kick pulse is produced by a special reproducing mode control circuit, and this kick pulse is applied to a tracking control coil in a signal pickup reproducing device, to shift the reproducing stylus to an adjacent track. Because the track is formed in a spiral manner, upon still picture reproduction, for example, the reproducing stylus is shifted to an adjacent track in the outer peripheral direction of the disc, once for every revolution of the disc. During the slow-motion reproduction, the reproducing stylus is shifted to an adjacent track in the outer peripheral direction of the disc, once for every predetermined number of revolutions over one inclusive of the disc. Further, upon quick-motion reproduction, the reproducing stylus is shifted to a track in the inner peripheral direction of the disc.

When manufacturing the disc, recording is first carried out with respect to an original disc which is coated with a photoresist, by using a laser beam which is light-modulated by the recording signal. Then, this original disc is subjected to processes such as developing process, plating process, and the like, to obtain a master disc. A mother disc and a stamper are successively obtained from this master disc. This stamper is used for molding a synthetic resin which is admixed with conductive particles, so as to form the disc. The disc thus formed is formed with pits in accordance with the recording signal When a reproducing stylus provided with an electrode traces over this disc, the electrostatic capacitance between the disc and the electrode of the reproducing stylus varies according to the pits formed on the disc, and the recorded signal is reproduced according to this variation in electrostatic capacitance.

However, if extraneous particles exist on the original disc or the stamper during the above manufacturing process, concave portions corresponding to the extraneous particles will be formed in the stamper, and a disc formed by such stamper will be formed with convex portions. In addition, when foreign substances are mixed into the molding material upon forming of the disc and the stamper becomes scratched, a disc formed by such stamper will be formed with convex portions in correspondence with concave portions of the scratches on the stamper.

The length or width of the undesirable convex portion formed on the surface of the disc is in the range of several tens of $\mu m$ to several hundred $\mu m$, and the height is in the range of several $\mu m$ to several tens of $\mu m$, for example. On the other hand, the track pitch of the pits of the recorded signal is 1.35 $\mu m$, and the depth is 0.2 $\mu m$ to 0.4 $\mu m$, for example. The disc is rotated at a rotational speed of 900 rpm, for example. If the stylus pressure of the reproducing stylus which traces over the surface of the rotating disc is small, there will be a phenomenon in which the reproducing stylus will separate from the disc surface due to the shock introduced when the reproducing stylus hits the convex portion formed on the disc surface and then make contact with the disc surface again at a part of the disc well past that convex portion. While the reproducing stylus is separated from the disc surface due to the hitting of the convex portion formed on the disc surface, the recorded signal will not be reproduced, and signal dropout will be introduced.

Normally, a known dropout compensation circuit is provided within the reproducing circuit. When signal dropout occurs, the dropout compensation circuit carries out the dropout compensation by use of a signal which is obtained by delaying a signal within a horizontal scanning period prior to the horizontal scanning period in which the dropout exists. The signal dropout introduced due to the convex portion having the above described size formed on the disc surface, can be compensated at the dropout compensation circuit. However, the signal dropout introduced due to the phenomenon in which the reproducing stylus jumps and separates from the disc surface when hitting the convex portion formed on the disc surface, has a long duration timewise, and it is not always possible to compensate for this kind of signal dropout by the above dropout compensation circuit.

The main body of the reproducing stylus is normally formed of a hard material such as diamond. According to experiments performed by the present inventor, it was found that when the stylus pressure of the reproducing stylus is set large, the reproducing stylus may scrape off the convex portion formed on the disc surface. However, if the stylus pressure of the reproducing stylus is constantly set large so as to scrape off the convex portion formed on the disc surface, the wear of the reproducing stylus and the disc become large during the still picture reproduction in which the same track is repeatedly traced, for example, and there will be a problem in that the serviceable lives of the reproducing stylus and the disc will become short.

On the other hand, if a quick-motion reproduction is to be carried out by successively shifting the reproducing stylus to adjacent tracks, a large stylus pressure will be needed because the whole reproducing stylus must successively scrape off the convex portions formed on the disc surface.

SUMMARY OF THE INVENTION

Accordingly, it is a general object of the present invention to provide a novel and useful rotary recording medium reproducing apparatus in which the above described problems have been eliminated.

Another and more specific object of the present invention is to provide a rotary recording medium reproducing apparatus which reproduces recorded signals from a rotary recording medium by tracing over tracks on the rotary recording medium, by varying the stylus pressure according to the reproducing mode. According to the reproducing apparatus of the present invention, it is possible to scrape off unwanted convex portions formed on the surface of the rotary recording medium upon forming of the rotary recording medium, and moreover, it is possible to prolong the serviceable lives of the reproducing stylus and the rotary recording medium.

Other objects and further features of the present invention will be apparent from the following detailed description when read in conjunction with the accompanying drawings.

DETAILED DESCRIPTION

Figure 1:
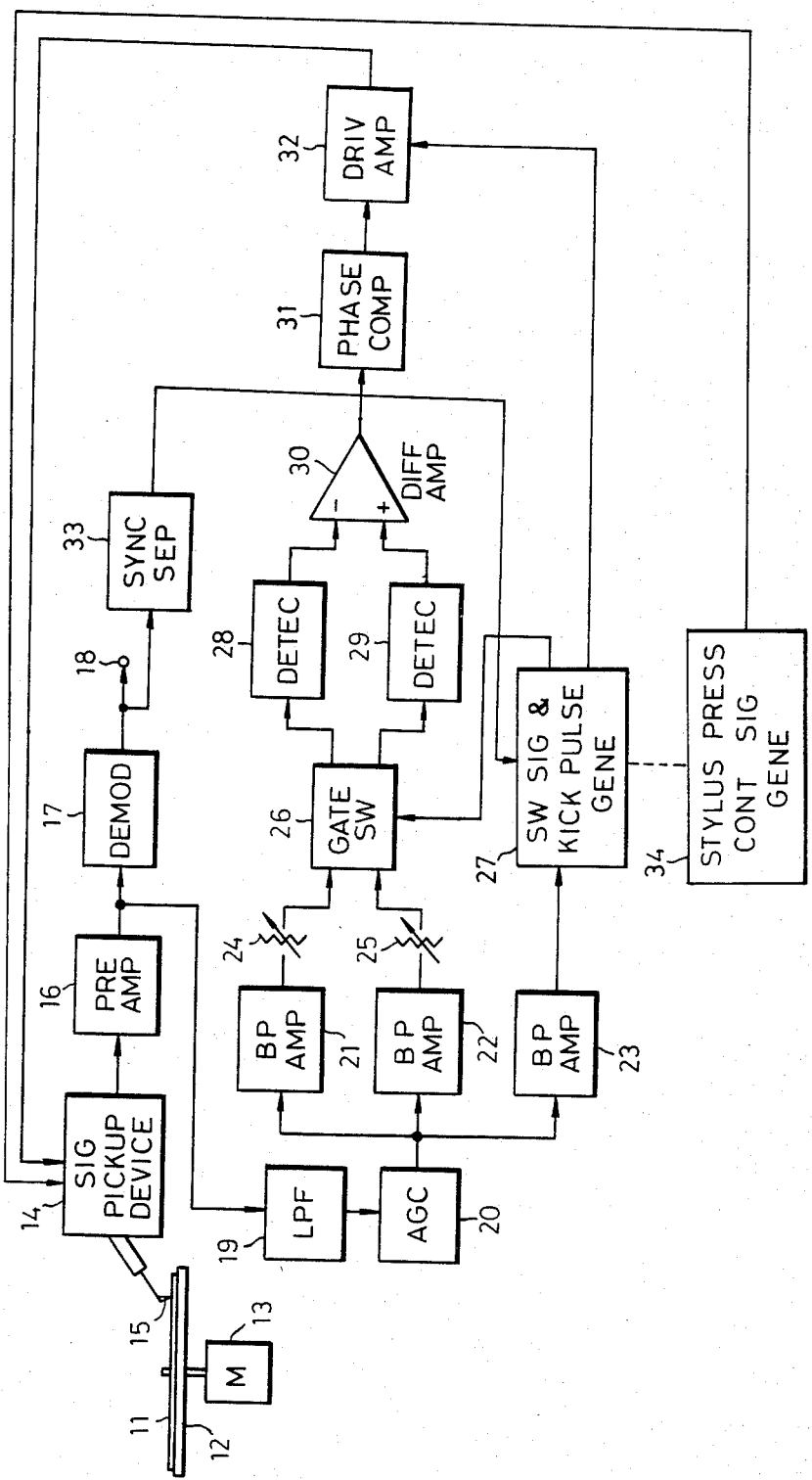
FIG. 1 is a systematic block diagram showing an embodiment of a rotary recording medium reproducing apparatus according to the present invention.

In FIG. 1, a disc 11 is placed onto a turntable 12, and rotated by a motor 13 at a rotational speed of 900 rpm, for example. A signal pickup device 14 used as a reproducing transducer, has a reproducing stylus 15, and moves continuously and linearly in a direction from the outer peripheral part to the inner peripheral part at a speed equal to the distance of one track pitch per revolution of the turntable 12, during a forward normal reproduction mode. Accordingly, the reproducing stylus 15 of the signal pickup device 14 travels radially across the rotating disc 11 and relatively traces over a spiral track on the disc 11.

Figure 3:
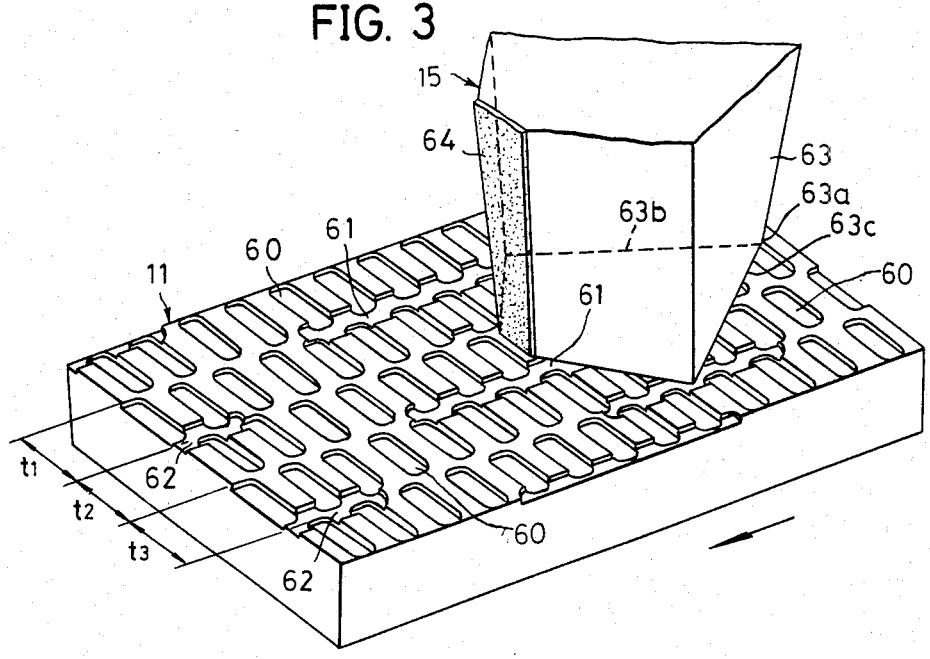
FIG. 3 is a perspective view, in an enlarged scale, showing a part of a rotary recording medium together with a tip end part of a reproducing stylus.

A main information signal comprising a video signal and an audio signal is recorded on the spiral track with pits formed on the disc 11 according to the information contents of the signal. One part of this track is shown in an enlarged scale in FIG. 3. In FIG. 3, track turns of a single continuous track, corresponding to each revolution of the disc 11, are designated by t1, t2, t3, . . . . Each track turn is constituted by the formation of pits 60 of the main information signal along a plane track path and has no stylus guide groove formed therein. With respect to one track turn t1, for every interval corresponding to one horizontal scanning period (H) of the video signal, that is, with a frequency interval $f_H$, pits 61 of a first reference signal fp1 are formed on one lateral side of the track as viewed in the track path direction. Pits 62 of a second reference signal fp2 are formed on the other side of the track.

At an intermediate position between the centerlines of adjacent track turns, only pits of either one kind of the pits 61 and 62 of the above reference signals fp1 and fp2 are formed, and moreover, with respect to one track, the sides on which the pits 61 and 62 are formed are alternated for every track turn. That is, if the pits 61 and 62 are respectively formed on the right and left sides of one track turn, for example, the pits 62 and 61 will respectively be formed on the right and left sides of each of the adjacent track turns.

The tip end of the reproducing stylus 15 has a shape shown in FIG. 3. The reproducing stylus 15 is constituted by a diamond stylus structure 63 having a pentagon-shaped disc tracing surface which has a width greater than the track width, and an electrode 64 fixed to the rear face of the stylus structure 63. As the reproducing stylus 15 traces over along a track on the disc 11 rotating in a direction indicated by an arrow, the main information signal recorded thereon by the formation of pits is reproduced as variations in the electrostatic capacitance between the surface of the disc 11 and the electrode 64 of the reproducing stylus 15.

Figure 4:
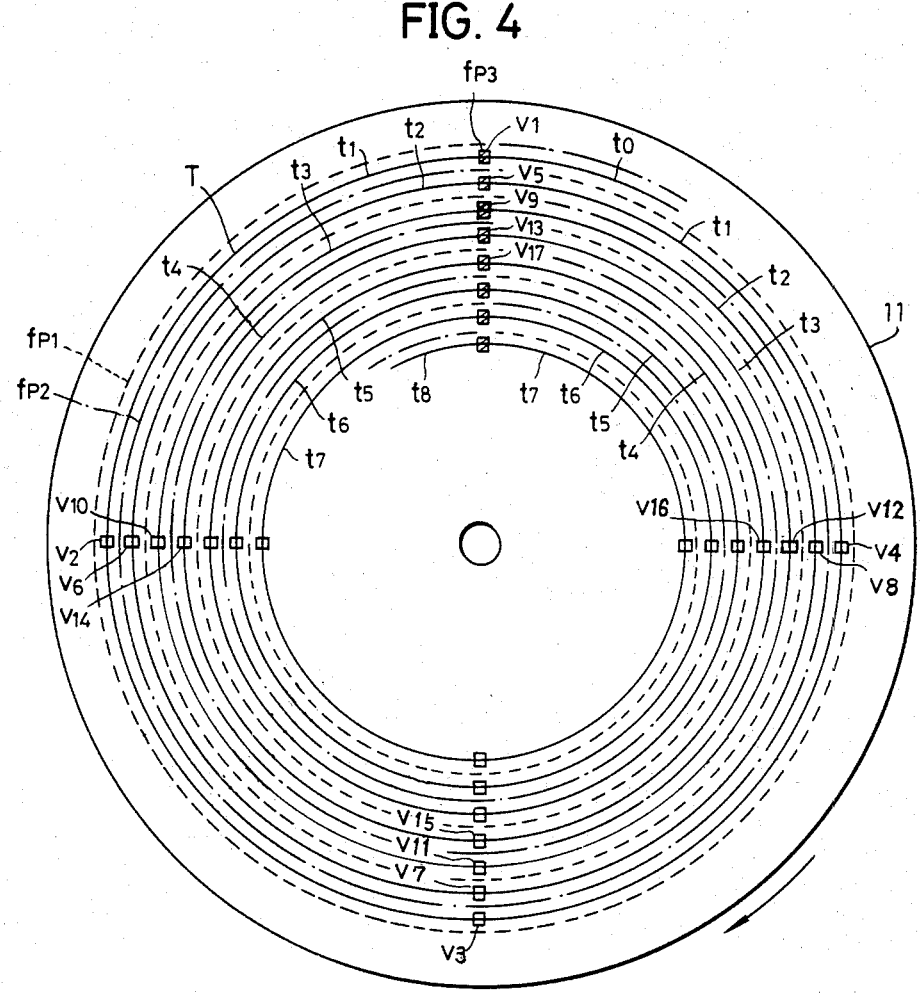
FIG. 4 shows a track pattern on the rotary recording medium.

On the disc 11, as indicated in FIG. 4, the main information signal is recorded along a spiral track T for four fields, for one revolution of the disc. In FIG. 4, the tracks of the first reference signal fp1 is shown by dotted lines while the second reference signal fp2 is shown by one-dot chain lines. The positions of the vertical synchronizing signals of respective fields are designated by reference characters V1, V2, V3, . . . , and the successive track turns corresponding to one revolution of the disc of the single spiral track T is designated by track turns t1, t2, t3, . . . . Furthermore, a third reference signal fp3 is recorded at the starting end positions V1, V5, V9, . . . of each of the track turns t1, t2, t3, . . . , that is, at positions where the reference signals fp1 and fp2 change over.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to the variation in the electrostatic capacitance, and is formed into a signal of a desired level. The resulting output of the preamplifier 16, is demodulated into the original main information signal by a demodulator 17, and a resulting output of the demodulator 17 is obtained through an output terminal 18.

The output signal of the preamplifier 16 is supplied to a lowpass filter 19 wherein the reference signals fp1, fp2, and fp3 are separated. The output reference signals of the lowpass filter 19 pass through an automatic gain control circuit 20, and are respectively supplied to amplifiers 21, 22, and 23. Here, each of the amplifiers 21, 22, and 23 are kinds of a bandpass amplifiers respectively designed to have steep passing frequency characteristics at only the respective frequencies fp1, fp2, and fp3. As a result, the signals having the frequencies fp1 and fp2 are respectively separated and obtained from the amplifiers 21 and 22. These signals obtained through the amplifiers 21 and 22 respectively pass through level adjustors 24 and 25 wherein the levels of the signals are adjusted. The resulting output signals of the level adjustors 24 and 25 are then supplied to a gate switching circuit 26. The reference signal fp3 separated and amplified at the bandpass amplifier 23 is supplied to a switching signal and kick pulse generator 27.

The gate switching circuit 26 performs switching of the reference signals fp1 and fp2 every one revolution period of the disc 11 upon normal reproduction, in response to the switching signal generated by the switching signal and kick pulse generator 27 which is applied thereto. Hence, due to the switching signal which reverses its polarity every 1/15 second, the signals fp1 and fp2 are always alternately supplied to detecting circuits 28 and 29 from the gate switching circuit 26.

The detecting circuits 28 and 29 detect envelopes of their respective input reference signals, and convert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal is compensated of its phase at a phase compensator 31, and then amplified to a specific level by a driving amplifier 32.

Figure 5:
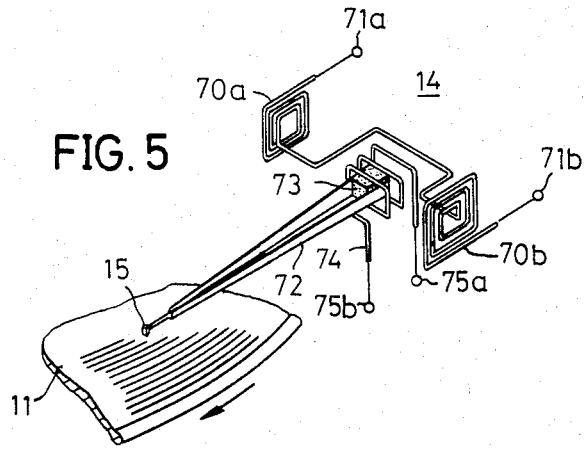
FIG. 5 is a general perspective view showing an essential part of a pickup device.

The output signal of the driving amplifier 32 is applied between terminals 71a and 71b of tracking coils 70a and 70b shown in FIG. 5 of the signal pickup device 14, as a control signal, to control these tracking coils 70a and 70b. Thus, tracking control is carried out with respect to the reproducing stylus 15 so that the above tracking error signal becomes zero, that is, so that the reproducing stylus 15 accurately traces over the track T on the disc 11. In the signal pickup device 14, the reproducing stylus 15 is fixed to a tip end of a cantilever 72, and a permanent magnet 73 is fixed to a rear end of the cantilever 72. The cantilever 72 is supported by a resilient support member (not shown) made of rubber and the like, in the vicinity of the rear end thereof. When the current is applied to the tracking coils 70a and 70b, the cantilever 72 is displaced due to the relation with the magnetic field generated by the permanent magnet 73, and the tracking control is accordingly carried out. Further, a pressure applying coil 74 is provided in the vicinity of the permanent magnet 73, separated from the permanent magnet 73.

In FIG. 1, the output main information signal of the demodulator 17 is supplied to a synchronizing signal separating circuit 33 wherein the vertical synchronizing signal of the video signal reproduced at the positions indicated by V1, V2, V3, . . . in FIG. 4 are separated. The separated vertical synchronizing signal is applied to the switching signal and kick pulse generator 27. As described before, the switching signal and kick pulse generator 27 generates the switching signal and supplies this switching signal to the gate switching circuit 26, and also generates a kick pulse and supplies this kick pulse to the driving amplifier 32. The kick pulse is applied to the tracking coils 70a and 70b through the driving amplifier 32, and shifts the reproducing stylus 15 to an adjacent track. The switching signal and kick pulse generator 27 operates in response to a reproducing mode setting operation performed at a reproducing mode setting operation part (not shown), and generates the switching signal and kick pulse in accordance with the set reproducing mode. In addition, a stylus pressure control signal generating circuit 34 which constitutes an essential part of the present invention, is further provided in the reproducing apparatus. The stylus pressure control signal generating circuit 34 is linked with and is switched by the switching of the switching signal and kick pulse generator 27, according to the above reproducing mode setting operation, and generates a stylus pressure control signal which is in accordance with the reproducing mode.

The stylus pressure control signal current from the generating circuit 34 is applied between terminals 75a and 775b of the stylus pressure applying coil 74 of the signal pickup device 14 shown in FIG. 5. Due to a magnetic force generated by the coil 74 with respect to the permanent magnet 73, a stylus pressure is applied onto the reproducing stylus 15 so that the reproducing stylus 15 makes contact with the surface of the disc 11 with a stylus pressure in accordance with the above stylus pressure control signal current.

Figure 2:
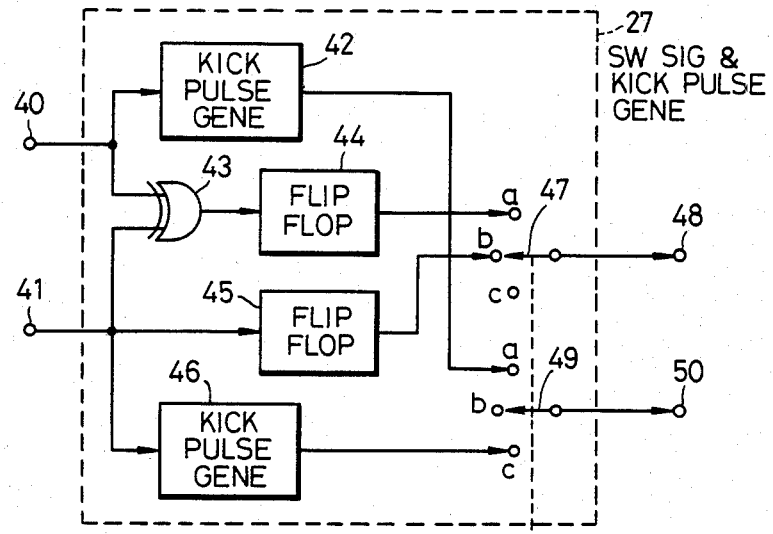
FIG. 2 is a diagram showing an embodiment of a concrete block and circuit system of an essential part of the block system shown in FIG. 1.

An embodiment of a concrete block and circuit system of the switching signal and kick pulse generator 27 and the stylus pressure control signal generating circuit 34, is shown in FIG. 2. In the switching signal and kick pulse generating circuit 27, the vertical synchronizing signal from the synchronizing signal separating circuit 33 is applied to a terminal 40, and the third reference signal fp3 from the amplifier 23 is applied to a terminal 41. The vertical synchronizing signal obtained through the terminal 40 is supplied to a kick pulse generator 42 for quintuple-speed quick-motion reproduction and an exclusive-OR gate 43. The kick pulse generator 42 is applied with four vertical synchronizing signals for one revolution of the disc 11, and generates a forward direction kick pulse according to each of the vertical synchronizing signals. The forward direction kick pulses thus generated by the kick pulse generator 42 is supplied to a contact a of a switch 49.

The exclusive-OR gate 43 is supplied with the vertical synchronizing signal and the reference signal fp3 respectively obtained through the terminals 40 and 41, and triggers a flip-flop 44 by its output. Accordingly, the flip-flop 44 produces a switching signal which does not change its state when both the vertical synchronizing signal and the reference signal fp3 exist simultaneously, and reverses its state when the reference signal fp3 does not exist and only the vertical synchronizing signal exists. The switching signal produced by the flip-flop 44 is supplied to a contact a of a switch 47.

The reference signal fp3 from the terminal 41 is supplied to a flip-flop 45 to trigger this flip-flop 45, and a switching signal which alternately repeats a rise and fall every time the reference signal fp3 is supplied thereto, is supplied to a contact b of the switch 47. A kick pulse generator 46 for still picture reproduction generates a reverse direction kick pulse every time the reference signal fp3 obtained through the terminal 41 is supplied thereto, and supplies the generated reverse direction kick pulse to a contact c of the switch 49. A contact c of the switch 47 and a contact b of the switch 49 are hanging terminals.

In the stylus pressure control signal generating circuit 34, resistors R1, R2, R3, and R4 are connected in series between a power source terminal 51 and ground. Connection points between the resistors R1 and R2, resistors R2 and R3, and resistors R3 and R4, are respectively connected to contacts a, b, and c of a switch 52. A capacitor C1 is connected between a moving contact of the switch 52 and ground, and a connection point between the switch 52 and the capacitor C1 is connected to an output terminal 53.

The switches 47, 49, and 52 are linked, and the switches 47, 49, and 52 are respectively switched and connected to their contact a during the quintuple-speed quick-motion reproduction mode, contact b during the normal reproduction mode, and contact c during the still picture reproduction mode, according to the reproducing mode setting operation performed at the reproducing apparatus.

When the reproducing apparatus is set to the quintuple-speed quick-motion reproduction mode, the switches 47, 49, and 52 respectively become switched and connected to their contact a according to the setting operation of the reproducing mode setting operation part. Hence, the output switching signal of the flip-flop 44 is applied to the gate switching circuit 26, through the switch 47 and an output terminal 48. Moreover, the output kick pulse of the kick pulse generator 42 is applied to the driving amplifier 32, through the switch 49 and an output terminal 50. Because the output kick pulse of the kick pulse generator 42 is generated at the positions V1, V2, V3, . . . on the disc 11 shown in FIG. 4, the reproducing stylus 15 is successively shifted to the tracks towards the inner periphery of the disc 11 at the positions V1, V2, V3, . . . . As a result, a quintuple-speed quick-motion reproduction is carried out.

At this point in time, a stylus pressure control signal of a large voltage Ea is obtained through the switch 52 which is connected to its contact a, and this stylus pressure control signal is applied between the terminals 75a and 75b of the stylus pressure applying coil 74. Accordingly, the reproducing stylus 15 makes contact with the disc 11 with a relatively large stylus pressure, that is, 120 mg, for example.

During the quintuple-speed quick-motion reproduction mode, the entire bottom surface of the reproducing stylus 15 makes contact with the unwanted convex portion formed on the surface of the disc 11. However, because the reproducing stylus 15 makes contact with he disc 11 with a relatively large stylus pressure, the reproducing stylus 15 can positively scrape off the convex portion formed on the surface of the disc 11. The convex portion on the disc surface is scraped off by a vertex portion 63a at a tip end of the stylus structure 63 along the relative moving direction of the reproducing stylus 15 with respect to the disc 11, and edge lines 63c and 63b of the stylus structure 63 extending to the right and left of the vertex portion 63a.

Next, when the reproducing apparatus is set to the normal reproduction mode, the switches 47, 49, and 52 respectively become switched and connected to their contact b. The output switching signal of the flip-flop 45 is obtained through the switch 47, and applied to the gate switching circuit 26. No kick pulse is obtained from the switch 49. Accordingly, the reproducing stylus 15 successively and continuously traces over each of the track turns t1, t2, . . . of the track T. Thus, the gate switching circuit 26 carries out switching for each revolution of the disc 11, and the normal reproduction is accordingly carried out.

At this point in time, a stylus pressure control signal of a medium voltage Eb is obtained through the switch 52 which is connected to its contact b, and this stylus pressure control signal is applied between the terminals 75a and 75b of the stylus pressure applying coil 74. Accordingly, the reproducing stylus 15 makes contact with the disc 11 with a normal stylus pressure, that is, 80 mg, for example.

During the normal reproduction mode, the reproducing stylus 15 continuously advances towards the inner periphery of the disc 11 in terms of track turns. Thus, the convex portion formed on the disc surface need only be scraped off by an amount corresponding to one track pitch, for every revolution of the disc 11. Hence, although the stylus pressure applied to the reproducing stylus 15 is a medium stylus pressure, the edge line 63b of the stylus structure 63 can easily scrape off the convex portion by an amount corresponding to one track pitch. Therefore, during the normal reproduction mode, the convex portion formed on the disc surface can positively be scraped off with a stylus pressure smaller than that upon quintuple-speed quick-motion reproduction mode. Furthermore, compared to a case where the large stylus pressure upon quintuple-speed quick-motion reproduction mode is applied to the reproducing stylus during the normal reproduction mode, the serviceable lives of the reproducing stylus 15 and the disc 11 are prolonged by applying the medium stylus pressure to the reproducing stylus 15 during the normal reproduction mode.

Next, when the reproducing apparatus is set to the still picture reproduction mode, the switches 47, 49, and 52 respectively become switched and connected to their contact c. No switching signal is obtained from the switch 47, and the gate switching circuit 26 does not perform switching. The output kick pulse of the kick pulse generator 46 is obtained through the switch 49, and applied to the driving amplifier 32. The coils 70a and 70b are applied with the reverse direction kick pulse for still picture reproduction, and the reproducing stylus 15 is shifted to an adjacent track towards the outer periphery of the disc 11 for every revolution of the disc 11. Accordingly, the reproducing stylus 15 repeatedly reproduces the same track turn, to carry out the still picture reproduction.

At this point in time, a stylus pressure control signal of a small voltage Ec is obtained through the switch 52 which is connected to its contact c, and this stylus pressure control signal is supplied to the stylus pressure applying coil 74. As a result, the reproducing stylus 15 makes contact with the disc 11 with a small stylus pressure, that is, 40 mg, for example.

During the still picture reproduction mode, the reproducing stylus 15 repeatedly traces over and reproduces the same track turn on the disc 11. For this reason, there is no need for the reproducing stylus 15 to scrape off the convex portion formed on the disc surface once the convex portion has been scraped off. Hence, no undesirable effects will be introduced due to the convex portion even if the stylus pressure applied to the reproducing stylus 15 is small. Moreover, because the stylus pressure during the still picture reproduction is even smaller than that upon normal reproduction, the serviceable lives of the reproducing stylus 15 and the disc 11 are further prolonged.

When the moving contact of the switch 52 is switched and connected to the contact c from the contact b in order to set the reproducing apparatus to the still picture reproduction mode, the voltage at the terminal 53 gradually decreases to the small voltage Ec from the medium voltage Eb because the capacitor C1 is connected to the terminal 53. Thus, at the initial stage of the still picture reproduction, the stylus pressure applied to the reproducing stylus 15 is the medium stylus pressure, and the stylus pressure gradually decreases from this medium stylus pressure. The reproducing stylus 15 positively scrapes off the convex portion formed on the disc surface while the stylus pressure applied thereto is the medium stylus pressure, and thereafter repeatedly traces over the same track turn with the small stylus pressure.

By providing the avove capacitor C1 at the terminal 53, the stylus pressure control signal voltage obtained through the terminal 53 gradually decreases to the medium voltage Eb from the large voltage Ea, and to the small voltage Ec from the medium voltage Eb, when the moving contact of the switch 52 is switched and connected to the contact b from the contact a, and to the contact c from the contact b. On the other hand, the stylus pressure control signal voltage obtained through the terminal 53 gradually increases to the medium voltage Eb from the small voltage Ec, and to the large voltage Ea from the medium voltage Eb, when the moving contact of the switch 52 is switched and connected to the contact b from the contact c, and to the contact a from the contact b.

When the reproducing mode of the reproducing apparatus is set to the still picture reproduction mode and the switch 52 is switched and connected to the contact c, the reproducing stylus 15 applied with the small stylus pressure may not be able to scrape off the convex portion formed on the disc surface if the stylus pressure control signal voltage decreases to the small voltage Ec from the medium voltage Eb within a short period of time. Hence, the capacitance of the capacitor C1 is selected so that the reproducing stylus 15 is applied with a stylus pressure sufficient for scraping off the convex portion for two to several revolutions of the disc 11, when the stylus pressure control signal voltage gradually decreases to the small voltage Ec from the medium voltage Eb. By selecting the capacitance of the capacitor C1 in this manner, the reproducing stylus 15 can positively scrape off the convex portion at the initial stage of the still picture reproduction, and moreover, the reproducing stylus 15 thereafter repeatedly traces over the same track turn with the small stylus pressure.

When the reproducing mode of the reproducing apparatus is to be changed to one reproducing mode to another, that is, when the reproducing mode is changed to the still picture reproduction mode from the normal reproduction mode, for example, it is better for the stylus pressure control signal voltage to decrease gradually. On the other hand, when the reproducing mode is changed to the normal reproduction mode from the still picture reproduction mode, or to the quintuple-speed quick-motion reproduction mode from the normal reproduction mode, it is better for the stylus pressure control signal voltage to increase instantaneously. Accordingly, description will be given hereinafter with respect to an embodiment which satisfies these demands.

Figure 6:
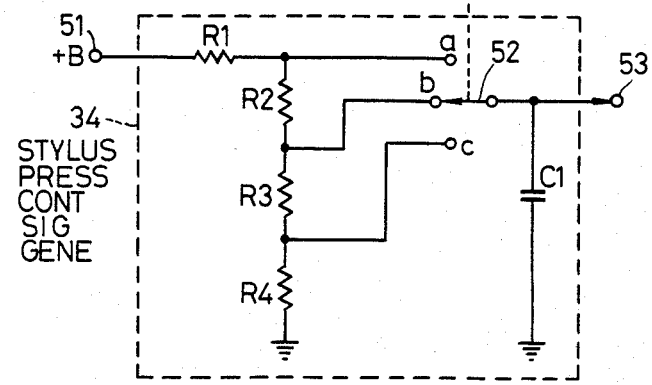
FIG. 6 is a circuit diagram showing another embodiment of a stylus pressure control signal generating circuit shown in FIG. 2.
Figure 6:
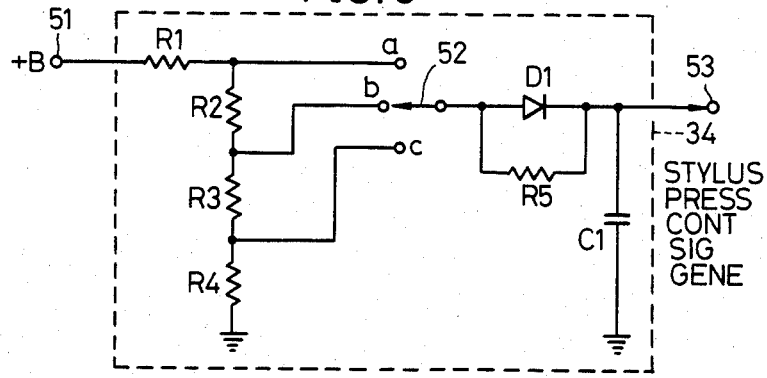

Another embodiment of the stylus pressure control signal generating circuit 34 is shown in FIG. 6. In FIG. 6, those parts which are the same as those corresponding parts in FIG. 2 are designated by the same reference numerals, and their description will be omitted. In the present embodiment, a parallel circuit comprising a diode D1 and a resistor R5, is connected between the moving contact of the switch 52 and the output terminal 53. The diode D1 is connected in the forward direction towards the terminal 53 from the switch 52. The capacitor C1 is connected between a connection point of the above parallel circuit and the terminal 53, and ground.

Hence, when the moving contact of the switch 52 switches and connects to the contact b from the contact c, a stylus pressure control signal of the medium voltage for normal reproduction is immediately obtained through the terminal 53. Further, when the moving contact of the switch 52 switches and connects to the contact c from the contact b, a stylus pressure control signal of the large voltage for quintuple-speed quick-motion reproduction is immediately obtained through the terminal 53. Thus, a stylus pressure control signal in accordance with the selected reproducing mode, is obtained from the start of the normal reproduction mode and the quintuple-speed quick-motion reproduction mode, and the reproducing stylus 15 scrapes off the convex portion with a stylus pressure in accordance with the selected reproducing mode. On the other hand, when the moving contact of the switch 52 switches and connected to the contact b from the contact a, the stylus pressure control signal voltage obtained through the terminal 53 gradually decreases to the medium voltage from the large voltage. Moreover, when the moving contact of the switch 52 switches and connects to the contact c from the contact b, the stylus pressure control signal voltage obtained through the terminal 53 gradually decreases to the small voltage from the medium voltage. Accordingly, because the stylus pressure control signal voltage does not immediately assume the small voltage particularly upon still picture reproduction, the reproducing stylus 15 can positively scrape off the convex portion before the stylus pressure assumes the small stylus pressure.

In the embodiments described heretofore, the reproducing modes were described as being three kinds, that is, the quintuple-speed quick-motion reproduction mode, the normal reproduction mode, and the still picture reproduction mode. However, the reproducing modes are not limited to these three kinds of reproducing modes, and may be other reproducing modes. For example, a triple-speed quick-motion reproduction mode may be additionally provided, and set the stylus pressure during this triple-speed quick-motion reproduction mode to a stylus pressure smaller than that upon quintuple-speed quick-motion reproduction and larger than that upon normal reproduction.

After the reproducing stylus 15 scrapes off the convex portions during each of the above described reproducing modes, there is no pit at the remains of the convex portions which are scraped off. Thus, no signals are reproduced at the remains of the convex portions, and signal dropouts will be introduced in the reproduced signal. However, such signal dropouts can be sufficiently compensated at a known compensation circuit described previously which compensates for the signal dropouts by use of a signal within one horizontal scanning period prior to the horizontal scanning period in which the signal dropout exists. Therefore, no problems will be introduced due to the remains of the scraped off convex portions.

Further, the present invention is not limited to these embodiments, but various variations and modifications may be made without departing from the scope of the present invention.

What is claimed is:

1. A rotary recording medium reproducing apparatus comprising:

a reproducing stylus for reproducing recorded signals from a rotary recording medium which is recorded with an information signal on a spiral track, by tracing over said spiral track on the rotary recording medium;

reproducing mode setting means for setting a reproducing mode of said reproducing apparatus to a special reproduction mode such as a quick-motion reproduction mode in which said reproducing stylus successively shifts to and traces over adjacent track turns of said spiral track, and a still picture reproduction mode in which said reproducing stylus repeatedly traces over the same track turn of said spiral track, besides a normal reproduction mode in which said reproducing stylus successively and continuously traces over the said spiral track;

stylus pressure control signal generating means for generating a stylus pressure control signal of a voltage having a magnitude in accordance with the set reproducing mode, according to the reproducing mode set by said reproducing mode setting means; and stylus pressure applying means applied with the stylus pressure control signal generated by said stylus pressure control signal generating means, for applying a stylus pressure to said reproducing stylus.

2. A reproducing apparatus as claimed in claim 1 in which, when the set reproducing mode is the quick-motion reproduction mode, said stylus pressure control signal generating means generates a stylus pressure control signal with a voltage having a magnitude larger than a voltage of a stylus pressure control signal generated upon normal reproduction mode, and said stylus pressure applying means applies a stylus pressure larger than a stylus pressure upon normal reproduction mode to said reproducing stylus in response to the stylus pressure control signal with the voltage having the larger magnitude.

3. A reproducing apparatus as claimed in claim 1 in which, when the set reproducing mode is the still picture reproduction mode, said stylus pressure control signal generating means generates a stylus pressure control signal with a voltage having a magnitude smaller than a voltage of a stylus pressure control signal generated upon normal reproduction mode, and said stylus pressure applying means applies a stylus pressure smaller than a stylus pressure upon normal reproduction mode to said reproducing stylus in response to the stylus pressure control signal with the voltage having the smaller magnitude.

4. A reproducing apparatus as claimed in claim 1 in which said stylus pressure control signal generating means comprises circuit means for gradually changing the voltage of a stylus pressure control signal from a certain voltage to a voltage smaller than a certain voltage, when producing the stylus pressure control signal having said smaller voltage from a state where a stylus pressure control signal having said certain voltage is produced, according to a change in the setting of the reproducing mode.

5. A reproducing apparatus as claimed in claim 1 in which said stylus pressure control signal generating means comprises circuit means for gradually changing the voltage of a stylus pressure control signal from a certain voltage to a voltage smaller than the certain voltage, when producing the stylus pressure control signal having said smaller voltage from a state where a stylus pressure control signal having said certain voltage is produced, according to a change in the setting of the reproducing mode, and for instantaneously changing the voltage of the stylus pressure control signal from a specific voltage to a voltage larger than the specific voltage, when producing the stylus pressure control signal having said larger voltage from a state where a stylus pressure control signal having said specific voltage is produced, according to a change in the setting of the reproducing mode.

6. A reproducing apparatus as claimed in claim 5 in which said circuit means comprises a parallel-connected circuit provided in an output line of the voltage of said stylus pressure control signal, said parallel-connected circuit having a forward-connected diode and a resistor, and a capacitor coupled between said parallel-connected circuit and ground in said output line.

* * * * *